United States Patent Office 3,100,789
Patented Aug. 13, 1963

3,100,789
PROCESS FOR MAKING A β-AMINO ALKYL SULFATE ESTER
Gilbert Gavlin, Lincolnwood, and Kiyoshi Hattori, Chicago, Ill., assignors to The Richardson Company, Melrose Park, Ill., a corporation of Ohio
No Drawing. Filed May 11, 1959, Ser. No. 812,110
3 Claims. (Cl. 260—458)

This invention is concerned with a new and improved process for making dimethylethylenimine and certain of its homologues.

It has been suggested that ethylenimine and certain of its homologues, such as dimethylethylenimine may be made by a number of different processes involving various successive, independent reactions and isolation of several intermediate compounds. Such processes, generally, result in a somewhat expensive product, due either to the cost of the basic compounds required for the particular process employed or the relatively low yields of the process. In our copending application, Serial No. 794,851, filed February 24, 1959, now U.S. 3,052,669, a process has been proposed for making certain alkylenimines from 2-oxazoline, which results in reasonably good yields of the desired imines at reduced cost.

It is the principal object of the present invention to provide a further improved process for making alkylenimines and particularly, the lower alkyl ethylenimines. Another object is to provide a process of the foregoing type which is economical and will result in relatively high yields of imines.

These and other objects are accomplished by reacting a nitrile with a chlorinated olefin in the presence of a strong acid catalyst, subjecting the reaction mass to hydrolysis conditions to form a β-aminoalkyl acid ester followed by treating the ester or its neutralized product with a strong base to form the desired imine. In further disclosing details of the process, the preferred acid catalyst, namely sulfuric acid, and the reaction products resulting therefrom will be used as exemplary.

Others, such as Ritter (JACS 72, 5577, 1950), have proposed reacting nitriles with chlorinated olefins under somewhat similar conditions and using an intermediate neutralization to produce an N-(2-halo-1-ethyl) amide or its condensation product an oxazoline. However, as far as is known, it has not been proposed to make an aminoalkyl hydrogen sulfate ester directly from the reaction of a nitrile with a chlorinated olefin, wherein the sulfate ester is formed without isolation of intermediate compounds.

Basically, the process of the present invention may be represented by the following reactions:

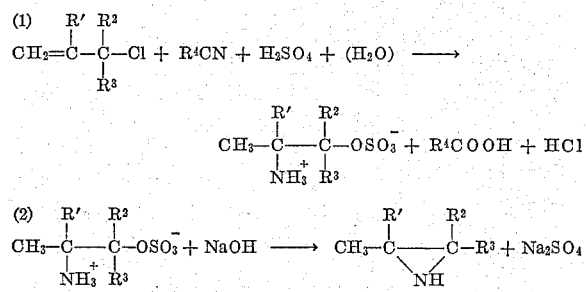

In the above compounds, R', R², R³ and R⁴ may be hydrogen, an alkyl or an aryl group, particularly the phenyl radical. For purposes of enhancing the compatibility of the reactants with the sulfuric acid, the variable groups are preferably hydrogen or the lower alkyls, such as methyl, ethyl or propyl radicals. Typical reactants which are commercially available and relatively inexpensive are nitriles, such as hydrogen cyanide or acetonitrile and a chlorinated olefin like allyl chloride or methallyl chloride (3-chloro-2-methyl propene).

The process comprises, in general, initially mixing, in substantially equal molar ratios, the nitrile and chlorinated olefin, with slight heating to a temperature of between 40 to 70° C. Concentrated sulfuric acid (96%), generally in a solvent, such as glacial acetic acid, is then added to the mixture over a period of about fifteen minutes while maintaining the temperature at about the initial level within the above range. Normally, the amount of concentrated sulfuric acid employed is in approximately the same molar equivalent as is the nitrile and chlorinated olefin. A reaction is commenced immediately, as is evidenced by the tendency of the temperature of the reaction mass to rise, which temperature, as indicated, is preferably maintained substantially within the range of 40° to 70° C. In order to insure complete reaction, the reaction mixture is usually permitted to stand over a period of eight to twelve hours.

When the reaction is complete for all practical purposes, the reaction mixture is diluted with excess water. Preferably, the dilution is accomplished by adding the reaction mixture to an ice-water mixture. After dilution, the solution is subjected to hydrolysis under reflux conditions for a period which may range up to fifteen hours, following which the solvents are removed, preferably under vacuum, and heating continued until the residue is reduced to a relatively viscous mass which, in some instances, may approach the solid state. Actually, the hydrolysis may be accomplished during the removal of solvents rather than performed as an independent step. Some degree of care should be exercised during the period when the viscous mass is being formed, particularly if a solid state is approached, in order to avoid charring or possible decomposition. Preferably, a uniform heating means, such as an oil bath should be used.

The aforementioned viscous mass, which has been determined to be an aminoalkyl hydrogen sulfate ester is preferably dissolved in water and neutralized. Neutralization converts the aminoalkyl hydrogen ester into an aminoalkyl sodium sulfate. Actually, this preliminary neutralization may be eliminated and the same conversion accomplished in the final reaction with concentrated alkali wherein the imine is formed, as is disclosed hereinafter.

Following neutralization, the water solution of the neutralized product is then converted to the imine in the same manner as is described in our copending application referred to hereinabove. Thus, the aminoalkyl sodium sulfate in water solution is added to a hot, concentrated solution of a strong base, for example, alkalis, such as sodium or potassium hydroxide, or an alkaline earth metal hydroxide. To obtain the maximum yield of imine, the base should be maintained at a minimum temperature of about 90° C. If temperatures much below this minimum are used, the imine yield will decrease and undesirable side reactions may occur, such as hydrolysis of the amino sulfate. Further, the basic solution should have a minimum base concentration of about thirty percent and may range up to the use of a solid base. A minimum concentration of about fifty percent base is preferred to insure maximum yields. The imine is formed immediately upon contact of the amino sulfate with the alkali and is distilled off together with water. The distillate may be collected by means of a condenser. Imines are normally soluble in water, however, if an alkali, such as sodium or potassium hydroxide is placed in the distillate receiving container, the imine will separate from the alkali solution and may be decanted.

While the aminoalkyl sodium sulfate is preferably added to the hot concentrated alkali in water solution, it is possible to add the sulfate directly as a solid. The addition should be made as rapidly as possible consistent with maintaining the temperature of the alkali and preventing the contents of the reaction container from being discharged due to the rapid formation of imine vapors.

Various solvents may be used in the initial reaction of nitrile and chlorinated olefin other than glacial acetic acid, the choice of solvent being determined to some extent by the reactants and ease of subsequent removal. Exemplary solvents are carboxylic acids and, particularly those carboxylic acids which are also produced as a by-product in the reaction, such as formic acid when the nitrile is hydrogen cyanide or acetic acid when the nitrile is acetonitrile. Where the nitrile and chlorinated olefin reactants are highly compatible with the acid, it may be desirable to substantially reduce and even eliminate the use of solvent.

In addition to concentrated sulfuric acid, other strong acids may be also employed to catalyze the initial reaction and, particularly those acids which are capable of catalyzing olefin reactions. Illustrative of such acids are: hydrogen fluoride, phosphoric, boron trifluoride, trifluoroacetic, aluminum trichloride and toluene sulfonic acid. However, if these additional acid catalysts are incapable of ultimately forming esters from the initial reaction product of the nitrile and chlorinated olefin, as is possible with sulfuric or phosphoric acid, it will be necessary, prior to the hydrolysis step, to add an acid which will form an ester when the reaction mass is subjected to hydrolysis. For example, hydrogen fluoride may be used to obtain the initial reaction desired between the nitrile and chlorinated olefin. However, upon diluting the reaction mass with water, it will also be necessary to add an ester-forming acid to achieve the final ester required in the process.

As further illustrating the invention, the following example is presented directed to the preparation of 2,2-dimethylethylenimine.

Example

A mixture of 32 ml. of acetonitrile (0.6 mole) and 60 ml. of methallyl chloride (0.6 mole) was warmed to 50–55° C. A solution of 33 ml. of 96% sulfuric acid (0.6 mole) in 90 ml. of acetic acid was added to the mixture over a period of ten to twenty minutes while stirring and maintaining the temperature 50–60° C. The reaction mixture was allowed to stand overnight and then poured onto 500 grams of an ice-water mixture. The solution was refluxed for fourteen hours following which the solvents were removed by distillation below 20 mm. pressure. After removing the solvents, the residue was reduced to a viscous mass, the mass was then heated for an additional hour at 150° C. The contents were removed, dissolved in approximately 250 ml. water and neutralized. The neutralized solution was added dropwise to a boiling solution of 100 grams sodium hydroxide in 100 ml. of water. The product, 2,2-dimethylethylenimine, was obtained as a distillate along with water and was separated by decantation from the water layer which is saturated with sodium hydroxide. The separated product was tested by forming the picrate derivative wherein the melting point was determined to be 128–128.5° (lit. 124–126) and by comparison of its infra-red spectrum with that of a known 2,2-dimethylethylenimine sample, the infra spectrum of each being substantially identical.

In a great many instances, methallyl chloride is supplied commercially as a mixture with its isomer isocrotonyl chloride. In view of the structure of the isocrotonyl chloride isomer and the conditions employed in the present process, it is not believed, at least at present, that the desired imines can be produced from this isomer. The methallyl chloride used in the above example was analyzed by refractive index and determined to include about forty percent of the isomeric isocrotonyl chloride. Based on the amount of methallyl chloride isomer used, the yield of 2,2-dimethylethylenimine was about forty-five percent. Commercially better yields, using the same general process, may be obtained by higher reaction temperatures, varying the order of addition or ratio of reactants and otherwise controlling the various conditions employed, as will be appreciated by those familiar with analogous types of reactions.

The lowest form of alkylenimine, namely ethylenimine has not been successfully produced by the present process. Thus, the corresponding chlorinated, unsaturated compound needed to make ethylenimine would be vinyl chloride. However, based on the present understanding of the reaction theory, when this latter compound is used in the aforementioned process, the nitrogen atom is attached to the same carbon atom as is the chlorine, rather than to an adjacent carbon atom, thereby rendering the resulting reaction product incapable of subsequently forming the desired imine.

The alkylenimines have been employed to increase the wet strength of paper, for water-proofing fibers and as an anchor coating for cellophane. New resin compounds may also be prepared by polymerizing the alkylenimines for use as coatings and the like.

Having described the invention and an exemplary embodiment thereof, the same is only intended to be limited by the scope of the following claims.

1. A process for making a β-amino alkyl sulfate ester which comprises reacting a chlorinated olefin having the formula

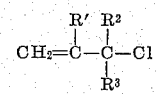

with a nitrile having the formula $R^4CN$, wherein $R'$, $R^2$, $R^3$ and $R^4$ are selected from the class consisting of hydrogen, methyl, ethyl, propyl and phenyl radicals, in the presence of a catalyst selected from the group consisting of sulfuric acid, hydrogen fluoride, phosphoric acid, boron trifluoride, trifluoroacetic acid, aluminum trifluoride and toluene sulfonic acid, hydrolyzing the reaction product, and esterifying the hydrolyzed reaction product with sulfuric acid.

2. A process for making a β-amino alkyl sulfate ester which comprises reacting methallyl chloride with acetonitrile in the presence of a catalyst selected from the group consisting of sulfuric acid, hydrogen fluoride, phosphoric acid, boron trifluoride, trifluoroacetic acid, aluminum trifluoride and toluene sulfonic acid, hydrolyzing the reaction product, and esterifying the hydrolyzed reaction product with sulfuric acid.

3. A process as described in claim 2 wherein the reaction is conducted in the presence of acetic acid as a solvent.

References Cited in the file of this patent
UNITED STATES PATENTS 2,206,273    Ulrich  ---------------- July 2, 1940
2,558,273    Schlapfer et al.  ---------- June 26, 1951

OTHER REFERENCES

Jones et al.: J. Organic Chemistry, pp. 125–6, Mar. 1944.

FIAT, Final Report No. 960, Office of Military Government for Germany (U.S.), Field Information Agency Technical.

Thurston, Polyethylenimine and Its Use in Paper Making, Oct. 10, 1946.

Campbell et al.: Journal of Organic Chemistry, vol. 8, pp. 103–109 (1943).